(12) United States Patent
Tetsuka et al.

(10) Patent No.: US 9,002,577 B2
(45) Date of Patent: Apr. 7, 2015

(54) TURN SIGNAL CANCELLING DEVICE FOR VEHICLE

(71) Applicant: Honda Motor Co., Ltd., Minato-Ku, Tokyo (JP)

(72) Inventors: Takashi Tetsuka, Wako (JP); Mana Hayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/179,982

(22) Filed: Feb. 13, 2014

(65) Prior Publication Data

US 2014/0244109 A1 Aug. 28, 2014

(30) Foreign Application Priority Data

Feb. 27, 2013 (JP) ................................. 2013-036935

(51) Int. Cl.
*B60Q 9/00* (2006.01)
*B60Q 1/40* (2006.01)

(52) U.S. Cl.
CPC ........................................ *B60Q 1/40* (2013.01)

(58) Field of Classification Search
None
See application file for complete search history.

(56) References Cited

U.S. PATENT DOCUMENTS

| | | | | |
|---|---|---|---|---|
| 4,030,066 A | * | 6/1977 | White ............................ | 340/476 |
| 4,333,071 A | * | 6/1982 | Kira et al. ...................... | 340/477 |
| 4,358,751 A | * | 11/1982 | Roudebush, Jr. ............. | 340/477 |
| 4,660,020 A | * | 4/1987 | Miyamaru et al. ............ | 340/477 |
| 4,792,785 A | * | 12/1988 | Miyamaru Yukio et al. . | 340/476 |
| 4,907,844 A | * | 3/1990 | White ............................ | 340/457 |
| 4,972,174 A | * | 11/1990 | Onan et al. .................... | 340/477 |
| 5,260,685 A | * | 11/1993 | Parker ............................ | 340/477 |
| 5,414,407 A | * | 5/1995 | Gerrans et al. ................ | 340/475 |
| 5,786,754 A | * | 7/1998 | Parker ............................ | 340/476 |
| 6,020,813 A | * | 2/2000 | Harris et al. ................... | 340/465 |
| 6,204,759 B1 | * | 3/2001 | Jahnke .......................... | 340/476 |
| 6,414,593 B1 | * | 7/2002 | Conner et al. ................ | 340/475 |
| 6,483,430 B2 | * | 11/2002 | Okuda et al. .................. | 340/476 |
| 6,975,218 B2 | * | 12/2005 | Madau .......................... | 340/476 |
| 6,982,638 B2 | * | 1/2006 | Bernosky ...................... | 340/476 |
| 7,102,500 B2 | * | 9/2006 | Martin et al. ................. | 340/477 |
| 7,173,524 B2 | * | 2/2007 | Ponziani ....................... | 340/476 |
| 7,408,455 B2 | * | 8/2008 | Ponziani ....................... | 340/476 |
| 7,482,916 B2 | * | 1/2009 | Au et al. ....................... | 340/475 |
| 7,783,399 B1 | * | 8/2010 | Young et al. .................. | 701/36 |
| 7,889,065 B2 | * | 2/2011 | Smith ............................ | 340/465 |
| 8,094,004 B2 | * | 1/2012 | Groeller et al. ............... | 340/477 |
| 2009/0207012 A1 | * | 8/2009 | Ponziani ....................... | 340/457 |
| 2010/0219051 A1 | * | 9/2010 | Shimizu et al. ............ | 200/61.27 |

(Continued)

FOREIGN PATENT DOCUMENTS

JP S58-47639 A 3/1983

*Primary Examiner* — Jonathan M Dager
(74) *Attorney, Agent, or Firm* — Carrier Blackman & Associates, P.C.; William D. Blackman; Joseph P. Carrier (57) ABSTRACT

A turn signal cancelling device for a motorcycle includes turn signal cancellation control unit configured to automatically deactivate a second turn signal after a second predetermined time has passed or after the motorcycle has travelled a second predetermined distance since an activation the second turn signal. The turn signal cancellation control unit is configured to automatically deactivate the second turn signal in a case where the activation of the second turn signal is performed before a first predetermined time has passed or before the motorcycle has travelled a first predetermined distance since an activation of a first turn signal is performed when a vehicle speed is equal to or higher than a predetermined speed.

9 Claims, 5 Drawing Sheets

(56) References Cited

U.S. PATENT DOCUMENTS

| | | | |
|---|---|---|---|
| 2010/0315217 A1* | 12/2010 | Miura et al. | 340/436 |
| 2011/0057785 A1* | 3/2011 | Golomb | 340/475 |
| 2011/0106376 A1* | 5/2011 | Tijerina et al. | 701/36 |

* cited by examiner

TURN SIGNAL CANCELLING DEVICE FOR VEHICLE

CROSS-REFERENCE TO RELATED APPLICATIONS

The present invention claims priority under 35 USC 119 based on Japanese patent application No. 2013-036935, filed on Feb. 27, 2013. The entire subject matter of this priority document, including specification claims and drawings thereof, is incorporated by reference herein.

BACKGROUND OF THE INVENTION

The present invention relates to a turn signal cancelling device for a vehicle, which is configured to automatically deactivate a turn signal under specific conditions.

Japanese Patent Laid-Open No. Sho 58-47639 describes an automatic turn signal cancelling device including: a circuit for determining whether a vehicle is traveling straight ahead or is turning from a steering angle of handlebars, and outputting a cancelling signal when determining that the vehicle is traveling straight ahead; a circuit for outputting a cancelling signal after the passage of a set time after a turn signal is activated; and a circuit for outputting a cancelling signal after the vehicle has traveled a set distance after the turn signal is activated; wherein the automatic turn signal cancelling device cancels the turn signal when receiving the cancelling signal from one of these circuits. Thus, the automatic turn signal cancelling device can cancel a turn signal even in a two-wheeled vehicle in which it is difficult to determine whether the vehicle is traveling straight ahead or is turning.

SUMMARY OF THE INVENTION

In Japanese Patent Laid-Open No. Sho 58-47639, turn signal cancellation is performed using time and distance. However, such a technique for determining whether to cancel the turn signal might not be sufficient for the certain driving scenarios. For example, times and travel distances from the activation of a turn signal to the turning off of the turn signal often differ between cases where turns are made at large and small intersections and cases where overtaking is performed.

It is accordingly an object of the present invention to provide a turn signal cancelling device for a vehicle in which the device determines travel conditions using turn signal operation patterns, thereby improving the accuracy of turn signal cancellation.

A turn signal cancelling device (100) for a vehicle (10) according to the present invention has the following features.

A first feature: a turn signal cancelling device (100) for a vehicle (10), the turn signal cancelling device (100) including: turn signal cancellation control unit (124) for automatically deactivating a turn signal (102); and vehicle speed detector (122) for detecting a vehicle speed; wherein in a case where one of a left turn signal and a right turn signal has been activated and an activation of an other of a left turn signal (102L) and a right turn signal (102R) is performed before a first predetermined time (T1) has passed or before the vehicle (10) has travelled a first predetermined distance (L1) since the activation of the one of the left turn signal (102L) and the right turn signal (102R) is performed when the vehicle speed is equal to or higher than a predetermined speed (V1), the turn signal cancellation control unit (124) automatically deactivates the other of the left turn signal (102L) and the right turn signal (102R) after a second predetermined time (T2) has passed or after the vehicle (10) has travelled a second predetermined distance (L2) since the operation for giving the instruction to activate the other of the left turn signal (102L) and the right turn signal (102R).

A second feature: in a case where the operation for giving the instruction to activate the other of the left turn signal (102L) and the right turn signal (102R) is performed in a state of the vehicle speed being lower than the predetermined speed (V1) and the one of the left turn signal (102L) and the right turn signal (102R) operating, the turn signal cancellation control unit (124) automatically deactivates the other of the left turn signal (102L) and the right turn signal (102R) after the vehicle (10) has travelled a third predetermined distance (L3) since the operation for giving the instruction to activate the other of the left turn signal (102L) and the right turn signal (102R).

A third feature: in a case where one of the left turn signal (102L) and the right turn signal (102R) is already operating when an operation of turning on an ignition switch is performed, the turn signal cancellation control unit (124) automatically deactivates the one of the left turn signal (102L) and the right turn signal (102R) after the vehicle (10) has travelled a third predetermined distance (L3) since the operation of turning on the ignition switch, and in a case where neither the left turn signal (102L) nor the right turn signal (102R) is operating when the operation of turning on the ignition switch is performed, the turn signal cancellation control unit (124) automatically deactivates one of the left turn signal (102L) and the right turn signal (102R) after the vehicle (10) has travelled the third predetermined distance (L3) since the operation for giving the instruction to activate the one of the left turn signal (102L) and the right turn signal (102R).

According to the first feature of the present invention, in a case where an operation for giving an instruction to activate an other of a left turn signal and a right turn signal is performed before a first predetermined time has passed or before the vehicle has travelled a first predetermined distance since an operation for giving an instruction to activate one of the left turn signal and the right turn signal is performed when the vehicle speed is equal to or higher than a predetermined speed, the other of the left turn signal and the right turn signal is automatically deactivated after a second predetermined time has passed or after the vehicle has travelled a second predetermined distance since the operation for giving the instruction to activate the other of the left turn signal and the right turn signal. Thus, turn signal cancellation can be performed in appropriate timing at a time of overtaking, and the accuracy of the turn signal cancellation can be improved.

According to the second feature of the present invention, in a case where the operation for giving the instruction to activate the other of the left turn signal and the right turn signal is performed in a state of the vehicle speed being lower than the predetermined speed and the one of the left turn signal and the right turn signal operating, the other of the left turn signal and the right turn signal is automatically deactivated after the vehicle has travelled a third predetermined distance since the operation for giving the instruction to activate the other of the left turn signal and the right turn signal. Thus, turn signal cancellation can be performed in appropriate timing at a time of a road shoulder start, and the accuracy of the turn signal cancellation can be improved.

According to the third feature of the present invention, in a case where one of the left turn signal and the right turn signal is already operating when an operation of turning on an ignition switch is performed, the one of the left turn signal and the right turn signal is automatically deactivated after the vehicle has travelled a third predetermined distance since the operation of turning on the ignition switch, and in a case where neither the left turn signal nor the right turn signal is operating when the operation of turning on the ignition switch is performed, one of the left turn signal and the right turn signal is automatically deactivated after the vehicle has travelled the third predetermined distance since the operation for giving the instruction to activate the one of the left turn signal and the right turn signal. Thus, turn signal cancellation can be performed in appropriate timing at a time of a road shoulder start, and the accuracy of the turn signal cancellation can be improved.

DETAILED DESCRIPTION

Figure 1:
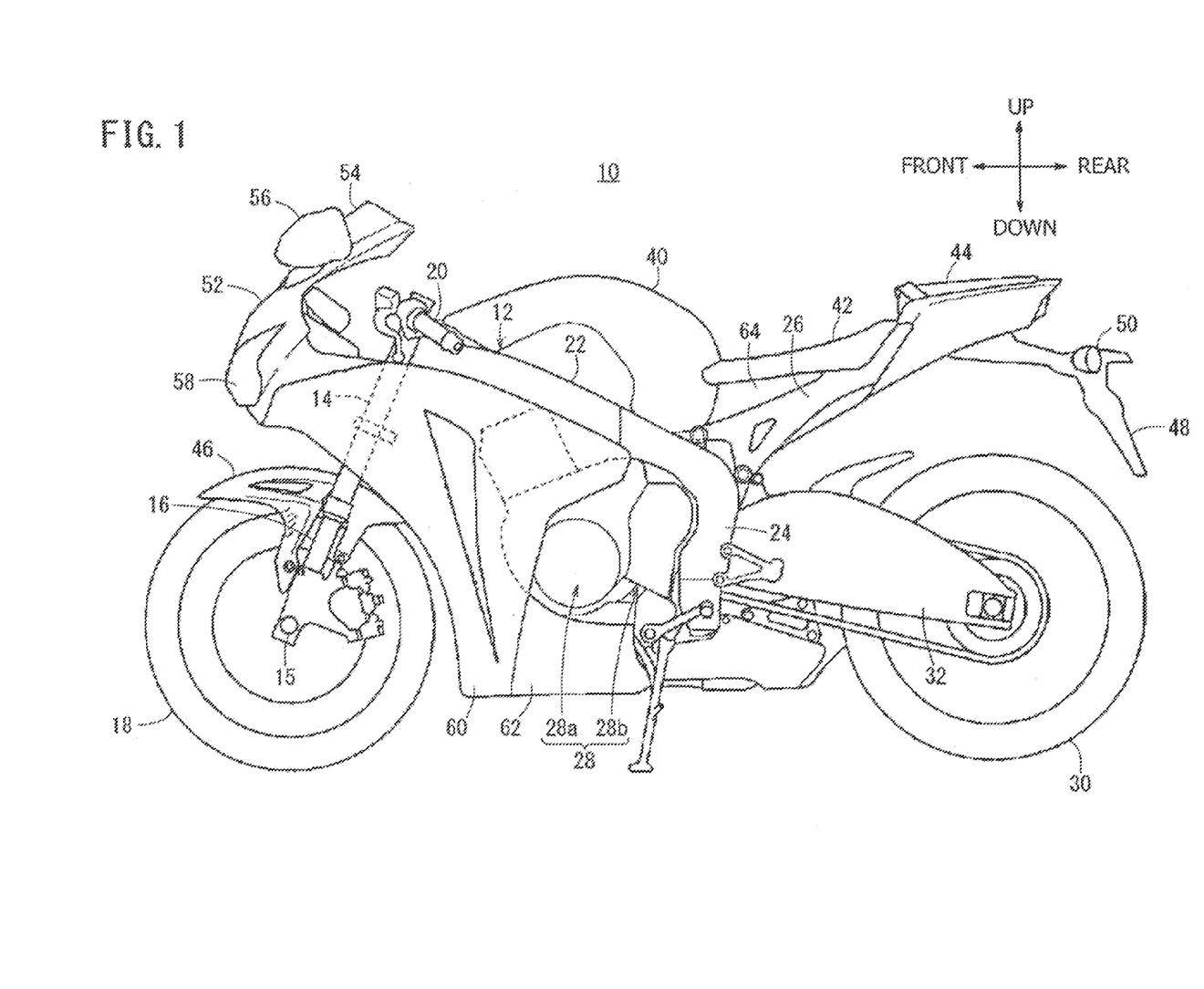
FIG. 1 is a side view of a motorcycle including a turn signal cancelling device.

FIG. 1 is a side view of a motorcycle 10 as a kind of vehicle including a turn signal cancelling device. Incidentally, unless otherwise specified, a forward-rearward direction and an upward-downward direction will be described according to arrow directions shown in FIG. 1, and a left-right direction will be described according to a direction as viewed from a driver seated on a vehicle body.

The motorcycle 10 includes: a vehicle body frame 12; a head pipe 14 provided to a front end portion of the vehicle body frame 12; a pair of left and right front fork members 16 rotatably supported by the head pipe 14; a front wheel (wheel) 18 as a steering wheel rotatably supported by the pair of left and right front fork members 16; and steerable bar-shaped handlebars 20 attached to an upper portion of the pair of left and right front fork members 16.

The vehicle body frame 12 includes: a pair of left and right main frames 22 extending rearward from the head pipe 14; a pair of left and right pivot plates 24 provided to the rear side of the pair of left and right main frames 22; and a pair of left and right seat frames 26 provided to the pair of left and right pivot plates 24 and extending rearward and obliquely upward. The pair of left and right main frames 22 is provided with a power unit 28 that generates power. A swing arm 32 that rotatably supports a rear wheel (wheel) 30 as a driving wheel is swingably supported by the pivot plates 24. The power unit 28 houses an engine 28a and a transmission 28b within a case of the power unit 28.

A fuel tank 40 for storing a fuel is provided on the pair of left and right main frames 22. A driver seat 42 on which a driver is to be seated is provided in the rear of the fuel tank 40 and on the pair of left and right seat frames 26. A passenger seat 44 on which a passenger is to be seated is provided in the rear of the driver seat 42. A front fender 46 is provided to the pair of left and right front fork members 16. A rear fender 48 is provided to a rear portion of the pair of left and right seat frames 26. The rear fender 48 supports a rear turn signal 50.

The motorcycle 10 includes: an upper cowl 52 provided to the vehicle body frame 12 to protect a front; a windscreen 54 provided on the upper cowl 52; a rearview mirror 56 provided to an upper portion of the upper cowl 52 so that the driver checks the rear; a headlight 58 provided to a front portion of the upper cowl 52 to irradiate the front; a middle cowl 60 for protecting a front side portion of the motorcycle 10; an under cover 62 provided to a lower portion of the middle cowl 60 and extending to the rear of the vehicle; and a side cover 64 provided on the seat frames 26 to cover a part from an upper portion of the seat frames 26 to a lower portion of the driver seat 42. The rearview mirror 56 includes a front turn signal.

Figure 2:
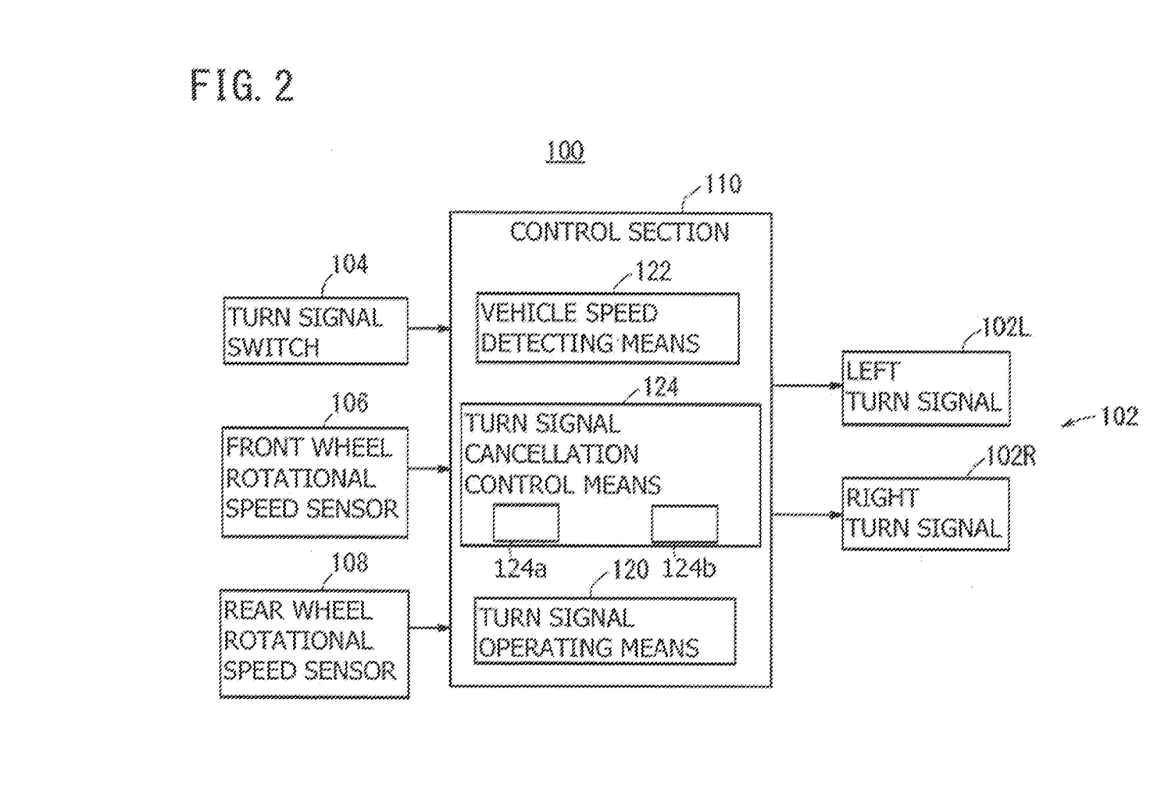
FIG. 2 is a functional block diagram of the turn signal cancelling device.

FIG. 2 is a functional block diagram of a turn signal cancelling device 100. The turn signal cancelling device 100 includes a left turn signal 102L, a right turn signal 102R, a turn signal switch (turn signal operating unit) 104, a front wheel rotational speed sensor (rotational speed detecting means) 106, a rear wheel rotational speed sensor (rotational speed detecting means) 108, and a control section 110. Incidentally, the left turn signal 102L and the right turn signal 102R may be referred to collectively as a turn signal 102.

The left turn signal 102L and the right turn signal 102R are each formed by the front turn signal and the rear turn signal 50. That is, the front turn signal has a left front turn signal and a right front turn signal. The rear turn signal 50 has a left rear turn signal and a right rear turn signal. The left turn signal 102L is formed by the left front turn signal and the left rear turn signal. The right turn signal 102R is formed by the right front turn signal and the right rear turn signal.

The turn signal switch 104 is a switch provided to the vicinity of the handlebars 20 for turning on (including blinking) one of the left turn signal 102L and the right turn signal 102R. The turn signal switch 104 has a lever movable in the left-right direction which lever gives an instruction to turn on the left turn signal 102L or the right turn signal 102R. The turn signal switch 104 outputs an operating signal corresponding to an operation of the driver to the control section 110.

The front wheel rotational speed sensor 106 is provided to a rotating shaft for rotating the front wheel 18. The front wheel rotational speed sensor 106 detects a rotational speed (rotational frequency) Vrf of the front wheel 18, and outputs the detected rotational speed Vrf to the control section 110. The rear wheel rotational speed sensor 108 is provided to a rotating shaft such as a countershaft or the like for rotating the rear wheel 30. The rear wheel rotational speed sensor 108 detects a rotational speed (rotational frequency) Vrr of the rear wheel 30, and outputs the detected rotational speed Vrr to the control section 110. The front wheel rotational speed sensor 106 and the rear wheel rotational speed sensor 108 are used also for other control such as ABS (Anti-lock Brake System) control, TCS (Traction Control System) control, and the like. Incidentally, in a case where the motorcycle 10 is of a motor scooter type, the rear wheel rotational speed sensor 108 may be provided to a gear on the rear wheel 30 side of a centrifugal clutch or the like.

The control section 110 includes turn signal operating unit 120, vehicle speed detector 122, and turn signal cancellation control unit 124. The control section 110 includes at least a computer formed by a CPU or the like not shown in the figures and a memory storing a program and the like. The computer reads the program stored in the memory, and thereby functions as the control section 110 according to the present embodiment.

The turn signal operating unit 120 activates and deactivates the left turn signal 102L or the right turn signal 102R according to an operation of the turn signal switch 104. For example, when the driver moves the lever of the turn signal switch 104 to a left side to turn left (a left turn), the turn signal operating unit 120 turns on (activates) the left turn signal 102L. In addition, when the driver moves the lever of the turn signal switch 104 to a right side to turn right (a right turn), the turn signal operating unit 120 turns on (activates) the right turn signal 102R. Incidentally, when the lever of the turn signal switch 104 is pressed, the turn signal operating unit 120 turns off the left turn signal 102L or the right turn signal 102R.

The vehicle speed detector 122 detects the speed (vehicle speed) V of the motorcycle 10 using at least one of the rotational speed Vrf of the front wheel 18 which rotational speed Vrf is detected by the front wheel rotational speed sensor 106 and the rotational speed Vrr of the rear wheel 30 which rotational speed Vrr is detected by the rear wheel rotational speed sensor 108.

The turn signal cancellation control unit 124 determines travel conditions using an operation pattern of the turn signal switch 104, and performs turn signal cancellation. The turn signal cancellation refers to automatically turning off (deactivating) the left turn signal 102L or the right turn signal 102R. The travel conditions include overtaking and a road shoulder start. Operations of the turn signal cancellation will be described later in detail.

The turn signal cancellation control unit 124 includes a timer 124a for clocking a time T and travel distance calculator 124b for calculating a travel distance L. The travel distance calculator 124b may calculate the travel distance L by integrating the vehicle speed V detected by the vehicle speed detector 122, or may calculate the travel distance L on the basis of the rotational speed Vrf of the front wheel 18 or the rotational speed Vrr of the rear wheel 30.

An operation of turn signal cancellation of the turn signal cancelling device 100 which operation corresponds to overtaking travel will next be described with reference to a flowchart of FIG. 3. First, the vehicle speed detector 122 starts to detect the vehicle speed V (step S1). The vehicle speed detector 122 detects the vehicle speed V using at least one of the rotational speed Vrf detected by the front wheel rotational speed sensor 106 and the rotational speed Vrr detected by the rear wheel rotational speed sensor 108. The front wheel rotational speed sensor 106, the rear wheel rotational speed sensor 108, and the vehicle speed detector 122 perform the detections in predetermined cycles.

Next, the turn signal cancellation control unit 124 determines whether or not an operation of the turn signal switch 104 for giving an instruction to activate one of the left turn signal 102L and the right turn signal 102R is performed (step S2). When the operation of the turn signal switch 104 for giving the instruction to activate the one turn signal 102 is not performed, the turn signal cancellation control unit 124 remains in step S2 until the operation is performed.

When the operation for giving the instruction to activate the one turn signal 102 is performed in step S2, the turn signal cancellation control unit 124 starts the timer 124a, and makes the travel distance calculator 124b start calculating a travel distance L (step S3).

Incidentally, when the operation of the turn signal switch 104 for giving the instruction to activate the one turn signal 102 is performed, the turn signal operating unit 120 activates the turn signal 102 according to the operation of the turn signal switch 104. For example, when an operation for giving an instruction to activate the right turn signal 102R is performed, the turn signal operating unit 120 activates the right turn signal 102R.

Next, the turn signal cancellation control unit 124 determines whether or not a latest detected vehicle speed V is equal to or higher than a predetermined speed V1 (for example 5 [km/h]) (step S4). When the turn signal cancellation control unit 124 determines in step S4 that the vehicle speed V is equal to or higher than the predetermined speed V1, the turn signal cancellation control unit 124 determines whether or not a predetermined time (first predetermined time) T1 has passed since the operation of the turn signal switch 104 for giving the instruction to activate the one turn signal 102 (step S5). Specifically, the turn signal cancellation control unit 124 determines whether or not the time T clocked by the timer 124a is equal to or more than a predetermined time T1.

When determining in step S5 that the predetermined time T1 has not passed since the operation of the turn signal switch 104 for giving the instruction to activate the one turn signal 102, the turn signal cancellation control unit 124 determines whether or not the motorcycle 10 has travelled a predetermined distance (first predetermined distance) L1 since the operation of the turn signal switch 104 for giving the instruction to activate the one turn signal 102 (step S6). Specifically, the turn signal cancellation control unit 124 determines whether or not the travel distance L calculated by the travel distance calculator 124b has become equal to or larger than the predetermined distance L1.

When it is determined in step S6 that the motorcycle 10 has not travelled the predetermined distance L1 since the operation of the turn signal switch 104 for giving the instruction to activate the one turn signal 102, the process proceeds to step S7. Incidentally, one of the operations of step S5 and step S6 may be omitted. For example, when it is determined in step S4 that the vehicle speed V is equal to or higher than the predetermined speed V1, the process proceeds to step S5, and when it is determined that the predetermined time T1 has not passed since the operation of the turn signal switch 104, the process proceeds directly to step S7. In addition, when it is determined in step S4 that the vehicle speed V is equal to or higher than the predetermined speed V1, the process may proceed to step S6, and when it is determined that the motorcycle 10 has not travelled the predetermined distance L1 since the operation of the turn signal switch 104, the process may proceed to step S7.

After proceeding to step S7, the turn signal cancellation control unit 124 determines whether or not an operation of the turn signal switch 104 for giving an instruction to activate the other turn signal 102 is performed (step S7). For example, when an operation of the turn signal switch 104 for giving an instruction to activate the right turn signal 102R is performed in step S2, the turn signal cancellation control unit 124 determines in step S7 whether or not an operation of the turn signal switch 104 for giving an instruction to activate the left turn signal 102L is performed.

Incidentally, when the operation of the turn signal switch 104 for giving the instruction to activate the other turn signal 102 is performed, the turn signal operating unit 120 deactivates the one turn signal 102, and activates the other turn signal 102. For example, when an operation for giving an instruction to activate the left turn signal 102L is performed while the right turn signal 102R is operating, the turn signal operating unit 120 deactivates the right turn signal 102R, and activates the left turn signal 102L.

When it is determined in step S7 that the operation of the turn signal switch 104 for giving the instruction to activate the other turn signal 102 is not performed, the process returns to step S4 to repeat the above-described operation.

When determining in step S7 that the operation of the turn signal switch 104 for giving the instruction to activate the other turn signal 102 is performed, on the other hand, the turn signal cancellation control unit 124 determines that overtaking is being performed (step S8). This is because it can be considered that the turn signal switch 104 is operated for overtaking travel when the vehicle speed V is equal to or higher than the predetermined speed V1, the predetermined time T1 has not passed, and the motorcycle 10 has not travelled the predetermined distance L1 in a period from the operation of the turn signal switch 104 for giving the instruction to activate the one turn signal 102 to the operation of the turn signal switch 104 for giving the instruction to activate the other turn signal 102.

When overtaking, the motorcycle 10 turns on the right turn signal 102R, then changes lanes to the right, overtakes a vehicle, thereafter turns on the left turn signal 102L, and then changes lanes to the left. It can therefore be considered that in general, the predetermined time T1 does not pass or a distance equal to or more than the predetermined distance L1 is not travelled in the period from the operation for giving the instruction to activate the one turn signal 102 to the operation for giving the instruction to activate the other turn signal 102.

A transition is made to other operation when it is determined that the vehicle speed V is not equal to or higher than the predetermined speed V1 (is lower than the predetermined speed V1) (NO in step S4), it is determined that the predetermined time T1 has passed (YES in step S5), or it is determined that the motorcycle 10 has travelled the predetermined distance L1 (YES in step S6) in the period from the operation of the turn signal switch 104 for giving the instruction to activate the one turn signal 102 to the operation of the turn signal switch 104 for giving the instruction to activate the other turn signal 102.

That is, in a case where the predetermined time T1 has passed or the motorcycle 10 has travelled the predetermined distance L1 when the vehicle speed V is equal to or higher than the predetermined speed V1, it can be considered that the turn signal switch 104 has been operated for a purpose of changing lanes (lane change) or the like other than overtaking. Thus, a transition is made to other operation. In addition, when the vehicle speed V is lower than the predetermined speed V1, overtaking travel is not performed to begin with. Thus, a transition is made to other operation also in this case.

When determining in step S8 that overtaking is being performed, the turn signal cancellation control unit 124 resets the time T clocked by the timer 124a and the travel distance L calculated by the travel distance calculator 124b (step S9), starts the timer 124a, and makes the travel distance calculator 124b start calculating a travel distance L (step S10).

Next, the turn signal cancellation control unit 124 determines whether or not a predetermined time (second predetermined time) T2 has passed since the determination that overtaking is being performed, that is, since the operation of the turn signal switch 104 for giving the instruction to activate the other turn signal 102 (step S11). Specifically, the turn signal cancellation control unit 124 determines whether or not the time T clocked by the timer 124a has become equal to or more than a predetermined time T2.

When determining in step S11 that the predetermined time T2 has not passed since the operation of the turn signal switch 104 for giving the instruction to activate the other turn signal 102, the turn signal cancellation control unit 124 determines whether or not the motorcycle 10 has travelled a predetermined distance (second predetermined distance) L2 since the determination that overtaking is being performed, that is, since the operation of the turn signal switch 104 for giving the instruction to activate the other turn signal 102 (step S12). Specifically, the turn signal cancellation control unit 124 determines whether or not the travel distance L calculated by the travel distance calculator 124b has become equal to or larger than a predetermined distance L2.

When it is determined in step S12 that the motorcycle 10 has not travelled the predetermined distance L2 since the determination that overtaking is being performed, the process returns to step S11 to repeat the above-described operation.

When it is determined in step S11 that the predetermined time T2 has passed since the determination that overtaking is being performed, or it is determined in step S12 that the motorcycle 10 has travelled the predetermined distance L2 since the determination that overtaking is being performed, turn signal cancellation is performed (step S13). That is, the other turn signal 102 is automatically deactivated. The turn signal cancellation is performed because it is considered that the motorcycle 10 is returned to the original lane when the predetermined time T2 has passed or when the motorcycle 10 has travelled the predetermined distance L2 since the operation of the turn signal switch 104 for giving the instruction to activate the other turn signal 102.

Figure 3:
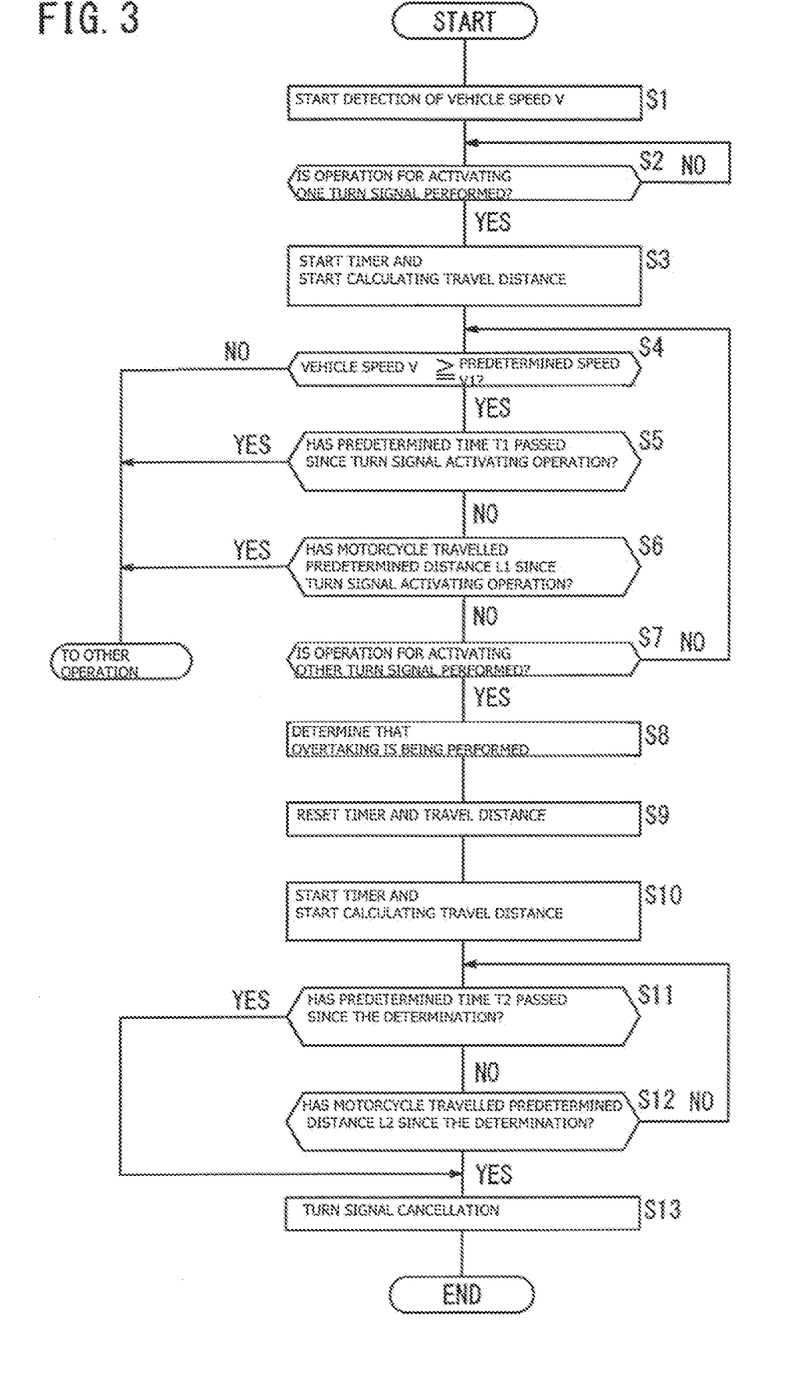
FIG. 3 is a flowchart of an operation of turn signal cancellation of the turn signal cancelling device which operation corresponds to overtaking travel.

Thus, according to the operation shown in FIG. 3, it is determined that overtaking is being performed in a case where the operation for giving the instruction to activate the other of the left turn signal 102L and the right turn signal 102R is performed before the predetermined time T1 has passed or before the motorcycle 10 has travelled the predetermined distance L1 since the operation for giving the instruction to activate one of the left turn signal 102L and the right turn signal 102R is performed when the vehicle speed V is equal to or higher than the predetermined speed V1. The other of the left turn signal 102L and the right turn signal 102R is automatically deactivated after the predetermined time T2 has passed or after the motorcycle 10 has travelled the predetermined distance L2 since the operation for giving the instruction to activate the other turn signal 102. Thus, the predetermined times T1 and T2 and the predetermined distances L1 and L2 are set easily, turn signal cancellation can be performed in appropriate timing at a time of overtaking, and the accuracy of the turn signal cancellation can be improved.

Figure 4:
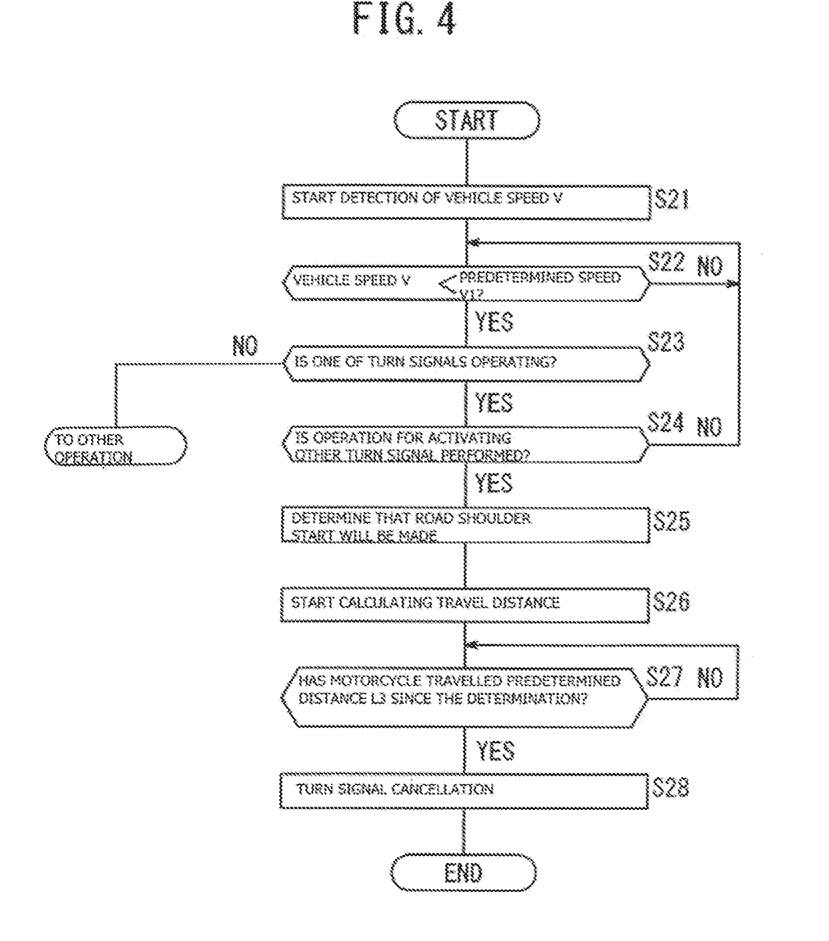
FIG. 4 is a flowchart of a first turn signal cancelling operation of the turn signal cancelling device which operation corresponds to a road shoulder start.

A first turn signal cancelling operation of the turn signal cancelling device 100 which operation corresponds to a road shoulder start will next be described with reference to a flowchart of FIG. 4. First, the vehicle speed detector 122 starts to detect the vehicle speed V (step S21). A process similar to that of step S1 in FIG. 3 is performed for the detection of the vehicle speed V.

Next, the turn signal cancellation control unit 124 determines whether or not a latest detected vehicle speed V is lower than the predetermined speed V1 (step S22). When the vehicle speed V is lower than the predetermined speed V1, it can be determined that the motorcycle 10 is in a stopped state or a state substantially close to a stopped state (state in which a foot of the driver is in contact with a road surface).

When it is determined in step S22 that the vehicle speed V is not lower than the predetermined speed V1, the turn signal cancellation control unit 124 remains in step S22 until the vehicle speed V becomes lower than the predetermined speed V1. When determining that the vehicle speed V is lower than the predetermined speed V1, the turn signal cancellation control unit 124 determines whether or not one of the turn signals 102 is operating (step S23). That is, whether or not one of the left turn signal 102L and the right turn signal 102R is operating is determined.

Next, when determining in step S23 that one of the turn signals 102 is operating, the turn signal cancellation control unit 124 determines whether or not an operation of the turn signal switch 104 for giving an instruction to activate the other turn signal 102 is performed (step S24). Incidentally, when the operation of the turn signal switch 104 for giving the instruction to activate the other turn signal 102 is performed, the turn signal operating unit 120 deactivates the one turn signal 102, and activates the other turn signal 102.

When it is determined in step S24 that the operation of the turn signal switch 104 for giving the instruction to activate the other turn signal 102 is not performed, the process returns to step S22 to repeat the above-described operation.

When it is determined in step S24 that the operation of the turn signal switch 104 for giving the instruction to activate the other turn signal 102 is performed, on the other hand, it is determined that a road shoulder start will be made (step S25).

In general, on a road in Japan, when the driver stops or parks the motorcycle 10 on a road shoulder, the driver pulls over the motorcycle 10 to the left while making the left turn signal 102L operate, and parks or stops the motorcycle 10 on the road shoulder. When a road shoulder start is made, the turn signal switch 104 is operated to deactivate the left turn signal 102L and activate the right turn signal 102R, and then the start is made.

Hence, in the present embodiment, it is determined that a road shoulder start will be made when one of the turn signals 102 is operating and the operation of the turn signal switch 104 for giving the instruction to activate the other turn signal 102 is performed in a state of the vehicle speed V being lower than the predetermined speed V1 (with the motorcycle 10 in a stopped state or in substantially a stopped state).

When it is determined in step S23 that none of the turn signals 102 is operating, that is, that no turn signal 102 is operating, on the other hand, a transition is made to other operation. When one turn signal 102 is deactivated before the operation of the turn signal switch 104 for giving the instruction to activate the other turn signal 102 is performed in the state of the vehicle speed V being lower than the predetermined speed V1, it can be considered that parking or the like rather than an operation of the turn signal switch 104 due to a road shoulder start is performed. Thus, a transition is made to other operation.

When determining in step S25 that a road shoulder start will be made, the turn signal cancellation control unit 124 makes the travel distance calculator 124b start calculating a travel distance L (step S26).

Next, the turn signal cancellation control unit 124 determines whether or not the motorcycle 10 has travelled a predetermined distance (third predetermined distance) L3 since the determination that a road shoulder start will be made, that is, since the operation of the turn signal switch 104 for giving the instruction to activate the other turn signal 102 (step S27). Specifically, the turn signal cancellation control unit 124 determines whether or not the travel distance L calculated by the travel distance calculator 124b has become equal to or larger than the predetermined distance L3.

When it is determined in step S27 that the motorcycle 10 has not travelled the predetermined distance L3 since the determination that a road shoulder start will be made, the process remains in step S27 until it is determined that the motorcycle 10 has travelled the predetermined distance L3.

When it is determined in step S27 that the motorcycle 10 has travelled the predetermined distance L3 since the determination that a road shoulder start will be made, turn signal cancellation is performed (step S28). That is, the other turn signal 102 is automatically deactivated.

Thus, according to the operation shown in FIG. 4, it is determined that a road shoulder start will be made in a case where the operation for giving the instruction to activate the other of the left turn signal 102L and the right turn signal 102R is performed in a state in which the vehicle speed V is lower than the predetermined speed V1 and one of the left turn signal 102L and the right turn signal 102R is operating. The other of the left turn signal 102L and the right turn signal 102R is automatically deactivated after the motorcycle 10 has travelled the predetermined distance L3 since the operation for giving the instruction to activate the other turn signal 102. Thus, the predetermined distance L3 is set easily, turn signal cancellation can be performed in appropriate timing at a time of a road shoulder start, and the accuracy of the turn signal cancellation can be improved.

Figure 5:
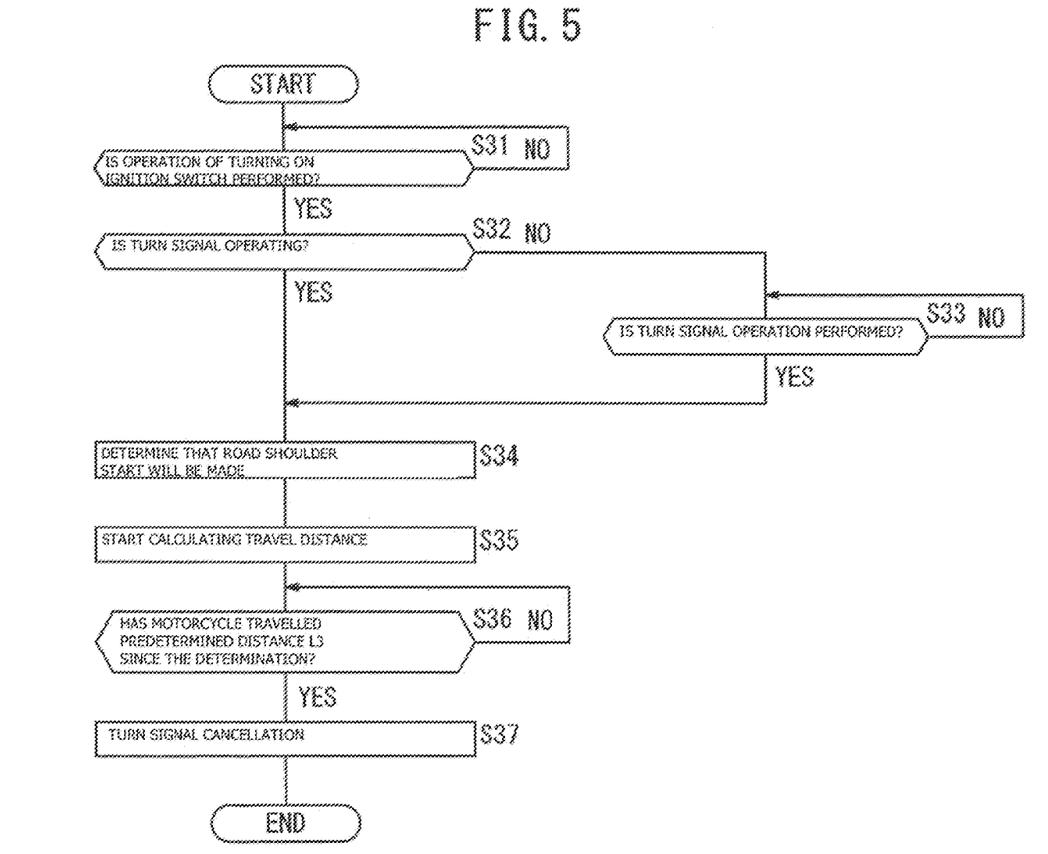
FIG. 5 is a flowchart of a second turn signal cancelling operation of the turn signal cancelling device which operation corresponds to a road shoulder start.

A second turn signal cancelling operation of the turn signal cancelling device 100 which operation corresponds to a road shoulder start will next be described with reference to a flowchart of FIG. 5. First, the turn signal cancellation control unit 124 determines whether or not an operation of turning on an ignition switch (not shown) of the motorcycle 10 is performed (step S31). The engine 28a can be started by turning on the ignition switch.

When determining in step S31 that the operation of turning on the ignition switch is not performed, the turn signal cancellation control unit 124 remains in step S31 until the operation of turning on the ignition switch is performed. When determining that the operation of turning on the ignition switch is performed, the turn signal cancellation control unit 124 determines whether or not a turn signal 102 is operating (step S32). That is, in step S32, whether the operation of turning on the ignition switch is performed while a turn signal 102 is operating is determined. Incidentally, the turn signal cancellation control unit 124 determines that a turn signal 102 is operating when one of the left turn signal 102L and the right turn signal 102R is operating.

When determining in step S32 that no turn signal 102 is operating, the turn signal cancellation control unit 124 determines whether or not an operation of the turn signal switch 104 for giving an instruction to activate a turn signal 102 is performed (step S33).

When determining in step S33 that the operation of the turn signal switch 104 for giving the instruction to activate a turn signal 102 is not performed, the turn signal cancellation control unit 124 remains in step S33 until the operation is performed. When determining that the operation of the turn signal switch 104 for giving the instruction to activate a turn signal 102 is performed, the turn signal cancellation control unit 124 proceeds to step S34, where the turn signal cancellation control unit 124 determines that a road shoulder start will be made. That is, in a case where no turn signal 102 is operating when the operation of turning on the ignition switch is performed, it is determined that a road shoulder start will be made when the operation of the turn signal switch 104 is performed.

When it is determined in step S32 that a turn signal 102 is operating, on the other hand, the process proceeds to step S34, where it is determined that a road shoulder start will be made. That is, in a case where a turn signal 102 is operating when the operation of turning on the ignition switch is performed, it is determined that a road shoulder start will be made when the operation of turning on the ignition switch is performed.

When the motorcycle 10 parked on a road shoulder is started, the start is made in a state of the ignition switch being on and the right turn signal 102R being operated. Thus, in a case where the ignition switch is turned on and thereafter the turn signal switch 104 is operated, it can be considered that the turn signal switch 104 is operated to make a road shoulder start. Thus, it is determined that a road shoulder start will be made when the turn signal switch 104 is operated. In addition, in a case where a turn signal 102 is operating when the ignition switch is off, it can be considered that the operation of turning on the ignition switch is performed to make a road shoulder start. Thus, it is determined that a road shoulder start will be made when the operation of turning on the ignition switch is performed.

When determining in step S34 that a road shoulder start will be made, the turn signal cancellation control unit 124 makes the travel distance calculator 124*b* start calculating a travel distance L (step S35).

Next, the turn signal cancellation control unit 124 determines whether or not the motorcycle 10 has travelled a predetermined distance (third predetermined distance) L3 since the determination that a road shoulder start will be made (step S36). Specifically, the turn signal cancellation control unit 124 determines whether or not the travel distance L calculated by the travel distance calculator 124*b* has become equal to or larger than the predetermined distance L3.

When it is determined in step S36 that the motorcycle 10 has not travelled the predetermined distance L3 since the determination that a road shoulder start will be made, the process remains in step S36 until it is determined that the motorcycle 10 has travelled the predetermined distance L3.

When it is determined in step S36 that the motorcycle 10 has travelled the predetermined distance L3 since the determination that a road shoulder start will be made, turn signal cancellation is performed (step S37). That is, the turn signal 102 is automatically deactivated.

Thus, according to the operation shown in FIG. 5, in a case where one of the left turn signal 102L and the right turn signal 102R is already operating when the operation of turning on the ignition switch is performed, it is determined that a road shoulder start will be made when the operation of turning on the ignition switch is performed. In a case where neither the left turn signal 102L nor the right turn signal 102R is operating when the operation of turning on the ignition switch is performed, it is determined that a road shoulder start will be made when an operation for giving an instruction to activate one of the left turn signal 102L and the right turn signal 102R is performed. The one of the left turn signal 102L and the right turn signal 102R is automatically deactivated after the motorcycle 10 has travelled the predetermined distance L3 since the determination. Thus, the predetermined distance L3 is set easily, turn signal cancellation can be performed in appropriate timing at a time of a road shoulder start, and the accuracy of the turn signal cancellation can be improved.

Incidentally, in the foregoing embodiment, the turn signal cancellation control unit 124 may further automatically deactivate one turn signal 102 that an instruction has been given to activate when the motorcycle 10 has travelled a predetermined distance L4 (for example 120 [m]) in a state in which the one turn signal 102 is operating since the operation of the turn signal switch 104 for giving the instruction to activate the one turn signal 102 was performed. In this case, when the operation for giving the instruction to activate the one turn signal 102 is performed, the turn signal cancellation control unit 124 makes the travel distance calculator 124*b* start calculating a travel distance L, and determines whether the motorcycle 10 has travelled the predetermined distance L4 on the basis of the travel distance L calculated by the travel distance calculator 124*b*.

In addition, in the foregoing embodiment, description has been made using the motorcycle 10 as a vehicle. However, the vehicle may be a motor-assisted bicycle, or may be a motor tricycle, a four-wheeled motor vehicle, or the like.

The present invention has been described above using preferred embodiments thereof. The technical scope of the present invention, however, is not limited to the scope described in the foregoing embodiments. It is obvious to those skilled in the art that various changes or improvements can be made to the foregoing embodiments. It is apparent from the description of claims that forms resulting from such changes or improvements can be included in the technical scope of the present invention. In addition, the reference symbols in parentheses provided in the claims are given in accordance with the reference symbols in the accompanying drawings in order to facilitate understanding of the present invention. The present invention should not be construed as being limited to the elements identified by the reference symbols.

The invention claimed is:

1. A turn signal cancelling device for a vehicle, the turn signal cancelling device comprising:
   a turn signal cancellation control unit configured to automatically deactivate a turn signal; and
   a vehicle speed detector configured to detect a vehicle speed;
   wherein in a case where one of a left turn signal and a right turn signal has been activated and where an operation for giving an instruction to activate another of a left turn signal and a right turn signal is performed before a first predetermined time has passed or before the vehicle has travelled a first predetermined distance since an operation for giving an instruction to activate the one of the left turn signal and the right turn signal is performed when the vehicle speed is equal to or higher than a predetermined speed, the turn signal cancellation control unit automatically deactivates the other of the left turn signal and the right turn signal after a second predetermined time has passed or after the vehicle has travelled a second predetermined distance since the operation for giving the instruction to activate the other of the left turn signal and the right turn signal.

2. The turn signal cancelling device for the vehicle according to claim 1, wherein in a case where the operation for giving the instruction to activate the other of the left turn signal and the right turn signal is performed in a state of the vehicle speed being lower than the predetermined speed and the one of the left turn signal and the right turn signal operating, the turn signal cancellation control unit automatically deactivates the other of the left turn signal and the right turn signal after the vehicle has travelled a third predetermined distance since the operation for giving the instruction to activate the other of the left turn signal and the right turn signal.

3. The turn signal cancelling device for the vehicle according to claim 1, wherein in a case where one of the left turn signal and the right turn signal is already operating when an operation of turning on an ignition switch is performed, the turn signal cancellation control unit automatically deactivates the one of the left turn signal and the right turn signal after the vehicle has travelled a third predetermined distance since the operation of turning on the ignition switch, and in a case where neither the left turn signal nor the right turn signal is operating when the operation of turning on the ignition switch is performed, the turn signal cancellation control unit automatically deactivates one of the left turn signal and the right turn signal after the vehicle has travelled the third predetermined distance since the operation for giving the instruction to activate the one of the left turn signal and the right turn signal.

4. A turn signal cancelling device for a vehicle, the turn signal cancelling device comprising:
   a vehicle speed detector configured to detect a vehicle speed; and
   a computer processing unit configured to automatically deactivate a turn signal, wherein in a case where a first turn signal has been activated and an activation of a second turn signal is performed before a first predetermined time has passed or before the vehicle has travelled a first predetermined distance since the activation of the first turn signal is performed when the vehicle speed is equal to or higher than a predetermined speed, the turn signal cancellation control unit automatically deactivates the second turn signal after a second predetermined time has passed or after the vehicle has travelled a second predetermined distance since the activation of the second turn signal.

5. The turn signal cancelling device for the vehicle according to claim 1, wherein in a case where the activation of the second turn signal is performed in a state of the vehicle speed being lower than the predetermined speed and the first turn signal is operating, the turn signal cancellation control unit automatically deactivates the second turn signal after the vehicle has travelled a third predetermined distance since the activation of the second turn signal.

6. The turn signal cancelling device for the vehicle according to claim 1, wherein in a case where the first turn signal is already activated when an operation of turning on an ignition switch is performed, the turn signal cancellation control unit automatically deactivates the first turn signal after the vehicle has travelled a third predetermined distance since the operation of turning on the ignition switch, and in a case where neither the first turn signal nor the second turn signal is activated when the operation of turning on the ignition switch is performed, the turn signal cancellation control unit automatically deactivates the first turn signal after the vehicle has travelled the third predetermined distance since the activation of the first turn signal.

7. A method for cancelling a turn signal of a vehicle by operation of an electronic control system, said method comprising the steps of:
   detecting the activation of a first turn signal;
   starting an electronic timer and initiating operation of a travel distance detector when the activation of the first turn signal is initially detected;
   detecting the activation of a second turn signal after the activation of the first turn signal has been detected;
   determining the vehicle speed using input from a wheel rotational speed sensor;
   determining that a necessary condition is met, which is that the activation of the second turn signal occurred either before a first predetermined time has passed or before the vehicle has travelled a first predetermined distance since the activation of the first turn signal, based on input received from the electronic timer and the travel distance detector at a time when the vehicle speed is equal to or higher than a predetermined speed; and
   after determining that the necessary condition is met, sending a signal from the electronic control system and thereby deactivating the second turn signal after a second predetermined time has passed or after the vehicle has travelled a second predetermined distance since the activation of the second turn signal.

8. The method for cancelling a turn signal of a vehicle according to claim 7, further comprising the steps of:
   determining that the activation of the second turn signal is performed in a state of the vehicle speed being lower than the predetermined speed and the first turn signal is operating; and
   deactivating the second turn signal after the vehicle has travelled a third predetermined distance since the activation of the second turn signal.

9. The method for cancelling a turn signal of a vehicle according to claim 7, further comprising the steps of:
   determining that the first turn signal is already activated when an operation of turning on an ignition switch is performed;
   deactivating the first turn signal after the vehicle has travelled a third predetermined distance since the operation of turning on the ignition switch;
   determining that neither the first turn signal nor the second turn signal is activated when the operation of turning on the ignition switch is performed; and
   deactivating the first turn signal after the vehicle has travelled the third predetermined distance since the activation of the first turn signal.

* * * * *